US00RE44752E

(19) United States
(12) Reissued Patent
Faber

(10) Patent Number: US RE44,752 E
(45) Date of Reissued Patent: Feb. 11, 2014

(54) PRINTER STAMP

(75) Inventor: Ernst Faber, Wels (AT)

(73) Assignee: Colop Stempelerzeugung Skopek GmbH & Co. KG, Wels (AT)

(21) Appl. No.: 29/414,353

(22) Filed: Feb. 28, 2012

Related U.S. Patent Documents

Reissue of:
(64) Patent No.: Des. 545,885
Issued: Jul. 3, 2007
Appl. No.: 29/238,067
Filed: Sep. 9, 2005

(30) Foreign Application Priority Data

Mar. 11, 2005 (EM) ..... 000309075-0002

(51) LOC (10) Cl. ..... 19-02
(52) U.S. Cl.
USPC ..... D18/15
(58) Field of Classification Search
USPC ..... D18/15, 16, 17, 18, 50; 101/333, 334, 101/327, 405, 406, 328, 352.07; 118/264, 118/268
See application file for complete search history.

(56) References Cited

U.S. PATENT DOCUMENTS

| | | | | | |
|---|---|---|---|---|---|
| 4,289,070 | A * | 9/1981 | MacGregor | 101/327 |
| D323,527 | S * | 1/1992 | Weir et al. | D18/15 |
| D387,799 | S * | 12/1997 | Daw et al. | D18/15 |
| 6,189,450 | B1 * | 2/2001 | Shih | 101/327 |
| D444,808 | S * | 7/2001 | Dour et al. | D18/15 |
| 6,499,398 | B2 * | 12/2002 | MacNeil | 101/327 |
| D492,957 | S * | 7/2004 | Wei | D18/15 |
| D493,192 | S * | 7/2004 | Sculler et al. | D18/15 |
| 6,761,114 | B2 * | 7/2004 | Koneczny et al. | 101/333 |
| 6,945,172 | B1 * | 9/2005 | Shih | 101/333 |
| D513,037 | S * | 12/2005 | Faber | D18/15 |
| D516,117 | S * | 2/2006 | Shih | D18/15 |
| D518,087 | S * | 3/2006 | Shih | D18/15 |
| D523,892 | S * | 6/2006 | Faber | D18/15 |
| 7,066,089 | B1 * | 6/2006 | Shih | 101/334 |

* cited by examiner

*Primary Examiner* — Phillip S Hyder
(74) *Attorney, Agent, or Firm* — Abelman, Frayne & Schwab

(57) CLAIM

The ornamental design for a printer stamp, as shown and described.

DESCRIPTION

FIG. 1 is a perspective view of a printer stamp showing my new design;
FIG. 2 is a top view thereof;
FIG. 3 is a front view thereof;
FIG. 4 is a left-side view thereof;
FIG. 5 is a right-side view thereof;
FIG. 6 is a rear view thereof; and,
FIG. 7 is a bottom view thereof.

1 Claim, 4 Drawing Sheets

Figure 1:
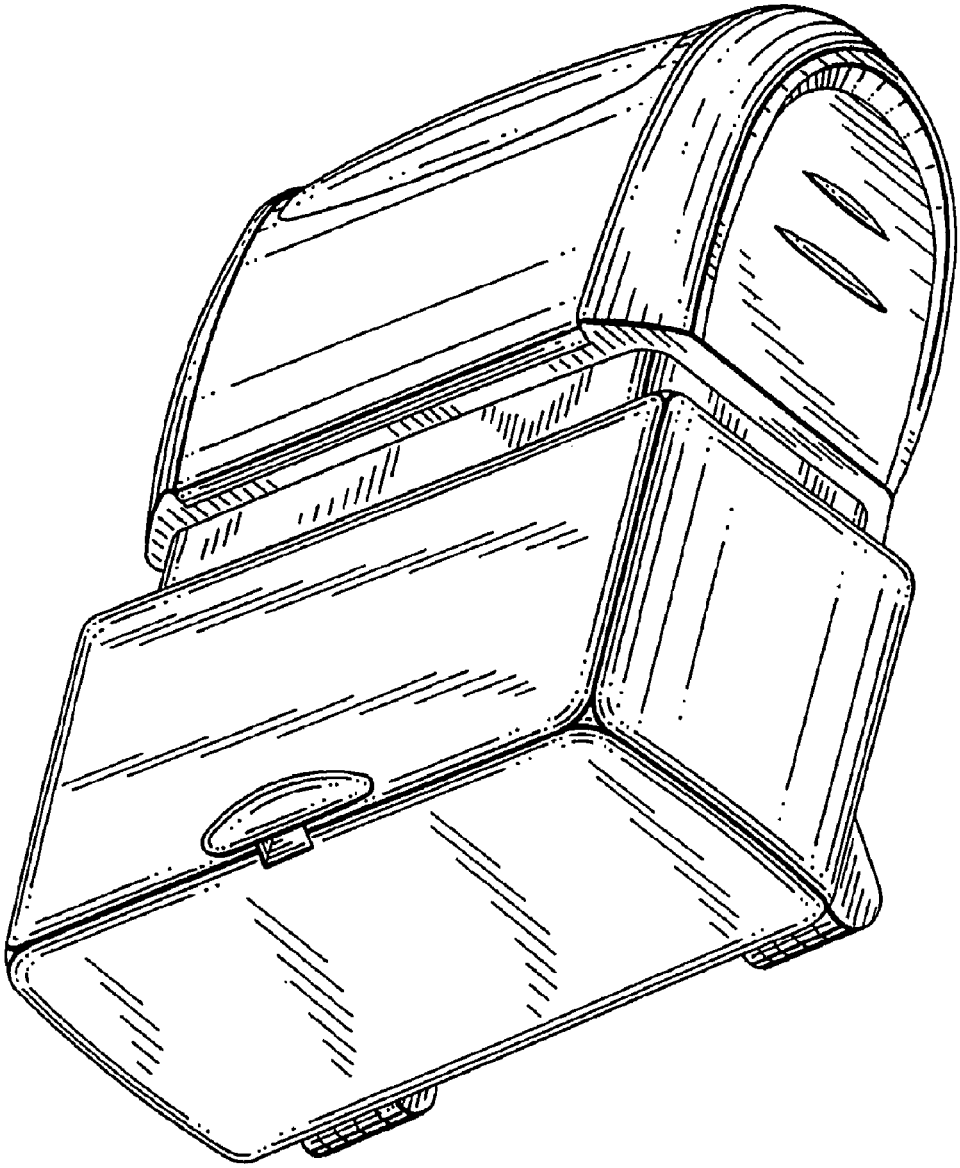
Figure 2:
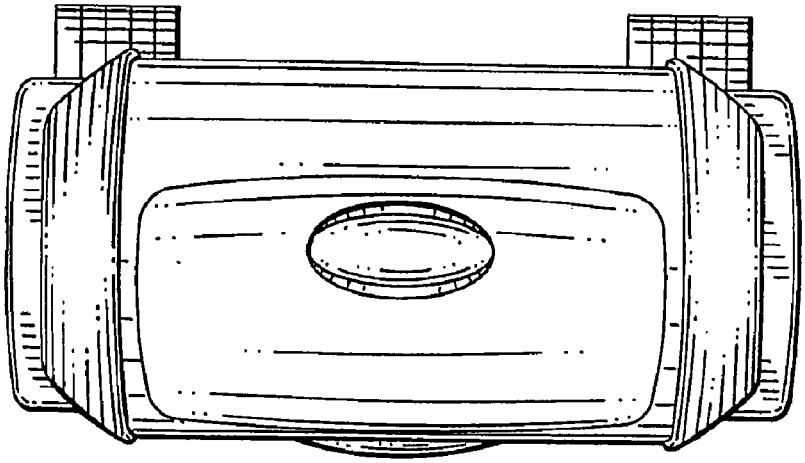
Figure 3:
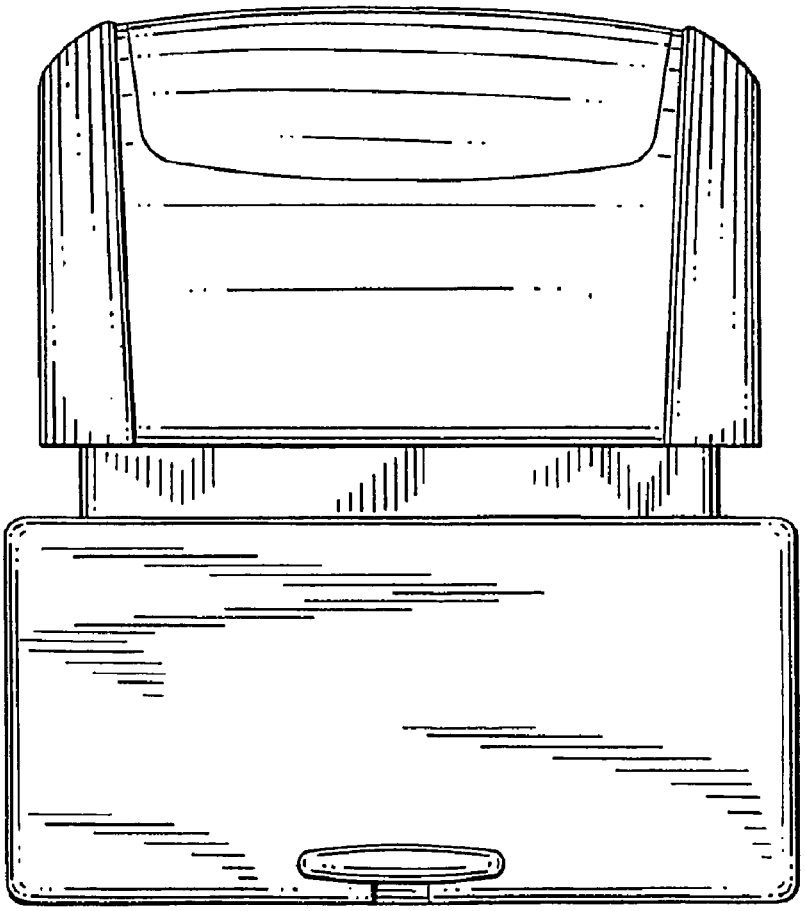
Figure 6:
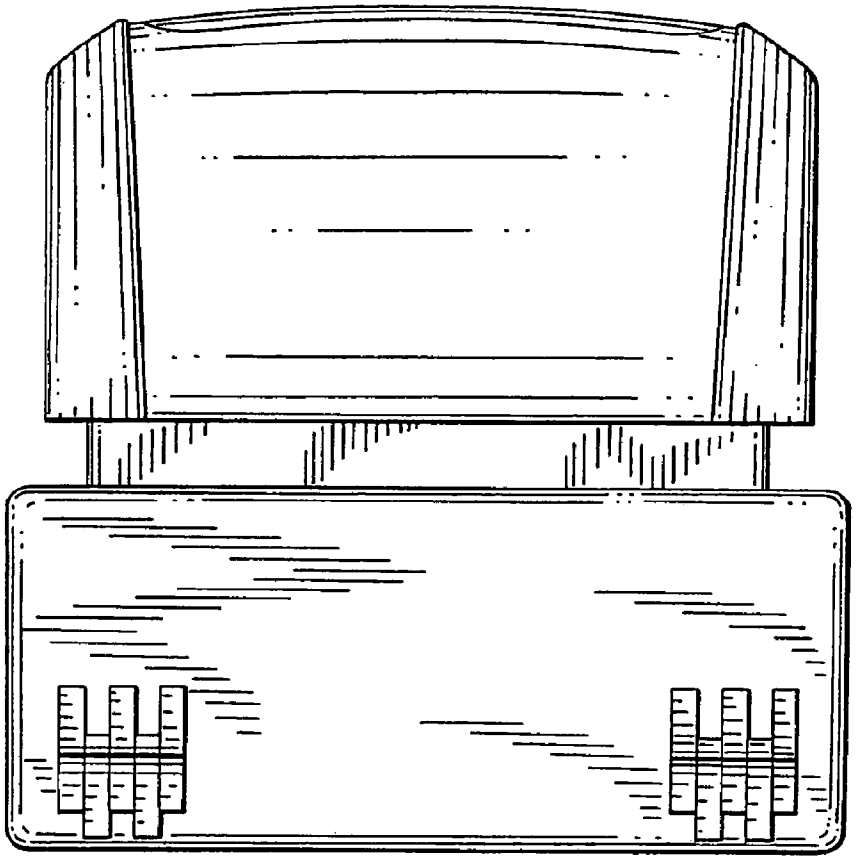
Figure 4:
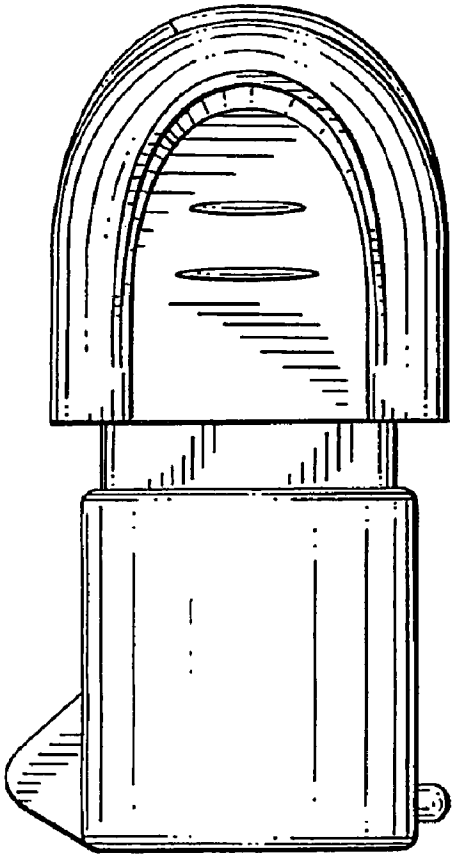
Figure 5:
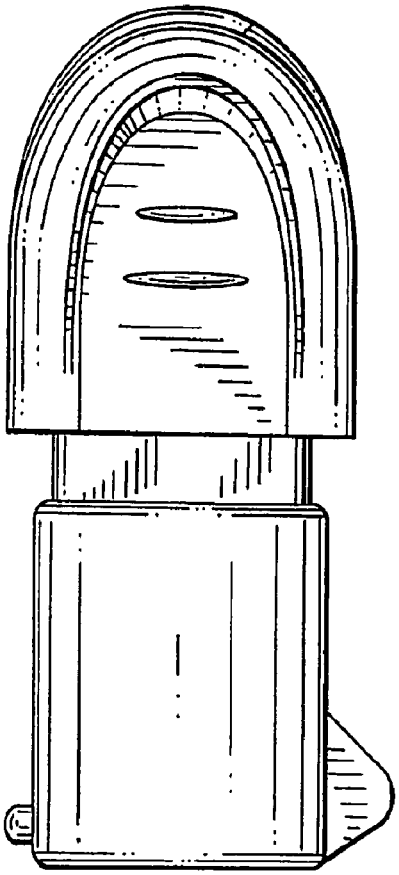
Figure 7:
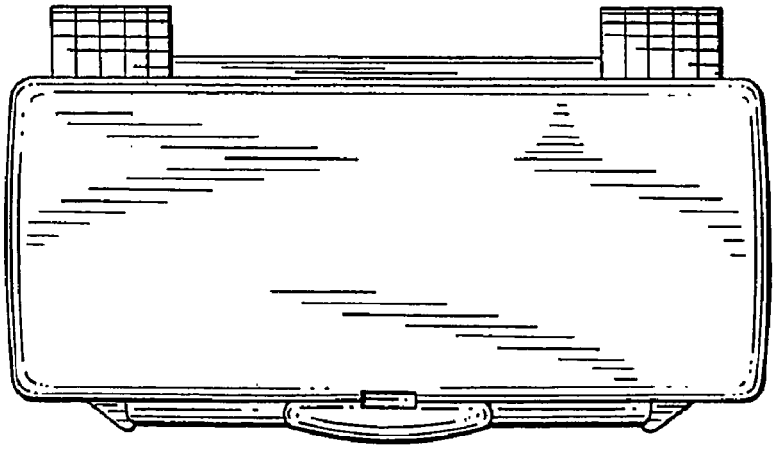

Matter enclosed in heavy brackets [ ] appears in the original patent but forms no part of this reissue; matter printed in italics indicates the additions made by reissue.